United States Patent
Heo

(10) Patent No.: US 10,115,395 B2
(45) Date of Patent: Oct. 30, 2018

(54) VIDEO DISPLAY DEVICE AND OPERATION METHOD THEREFOR

(71) Applicant: LG ELECTRONICS INC., Seoul (KR)

(72) Inventor: Seunghyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/320,265

(22) PCT Filed: Jul. 8, 2014

(86) PCT No.: PCT/KR2014/006111
§ 371 (c)(1),
(2) Date: Dec. 19, 2016

(87) PCT Pub. No.: WO2015/194693
PCT Pub. Date: Dec. 23, 2015

(65) Prior Publication Data
US 2017/0154625 A1  Jun. 1, 2017

(30) Foreign Application Priority Data
Jun. 17, 2014  (KR) .................. 10-2014-0073438

(51) Int. Cl.
*G10L 21/028* (2013.01)
*G10L 15/22* (2006.01)
*H04N 21/422* (2011.01)

(52) U.S. Cl.
CPC .......... *G10L 15/22* (2013.01); *G10L 21/028* (2013.01); *H04N 21/42203* (2013.01); *G10L 2015/223* (2013.01)

(58) Field of Classification Search
CPC . G10L 15/22; G10L 21/028; G10L 2015/223; H04N 21/42203
(Continued)

(56) References Cited

U.S. PATENT DOCUMENTS 6,219,645 B1 * 4/2001 Byers ................. G10L 15/02
  381/91
8,634,390 B2 * 1/2014 Ramakrishnan .. H04M 1/72533
  370/338
(Continued)

FOREIGN PATENT DOCUMENTS

EP   2731349      5/2014
KR   1020090025362  3/2009
(Continued)

OTHER PUBLICATIONS

PCT International Application No. PCT/KR2014/006111, International Search Report dated Feb. 4, 2015, 2 pages.
(Continued)

*Primary Examiner* — Bharatkumar S Shah
(74) *Attorney, Agent, or Firm* — Lee, Hong, Degerman, Kang & Waimey PC

(57) ABSTRACT

A method for operating a video display device according to an embodiment of the present invention includes: transmitting a voice acquisition command signal to at least one peripheral device connected to the video display device; receiving at least one voice signal for a user voice acquired by at least one peripheral device having received the voice acquisition command signal, and a voice signal for the user voice acquired by the video display device; comparing the plurality of acquired voice signals with each other; determining a voice signal subjected to voice recognition based on the comparison result; recognizing the user voice based on the determined voice signal; and performing a control operation corresponding to the recognized voice.

20 Claims, 14 Drawing Sheets

(58) Field of Classification Search
USPC .......................................................... 704/275
See application file for complete search history.

(56) References Cited

U.S. PATENT DOCUMENTS

| | | | |
|---|---|---|---|
| 2012/0042343 A1* | 2/2012 | Laligand ........ | H04N 21/234336 |
| | | | 725/53 |
| 2014/0136205 A1 | 5/2014 | Jang et al. | |
| 2014/0195244 A1* | 7/2014 | Cha ......................... | G06F 3/167 |
| | | | 704/270.1 |
| 2017/0337937 A1 | 11/2017 | Jang et al. | |

FOREIGN PATENT DOCUMENTS

| KR | 1020120046988 | 5/2012 |
|---|---|---|
| KR | 1020130083371 | 7/2013 |
| KR | 1020130088637 | 8/2013 |
| KR | 101391751 | 5/2014 |

OTHER PUBLICATIONS

European Patent Office Application Serial No. 14895263.3, Search Report dated Feb. 2, 2018, 8 pages.

\* cited by examiner

FIG. 14
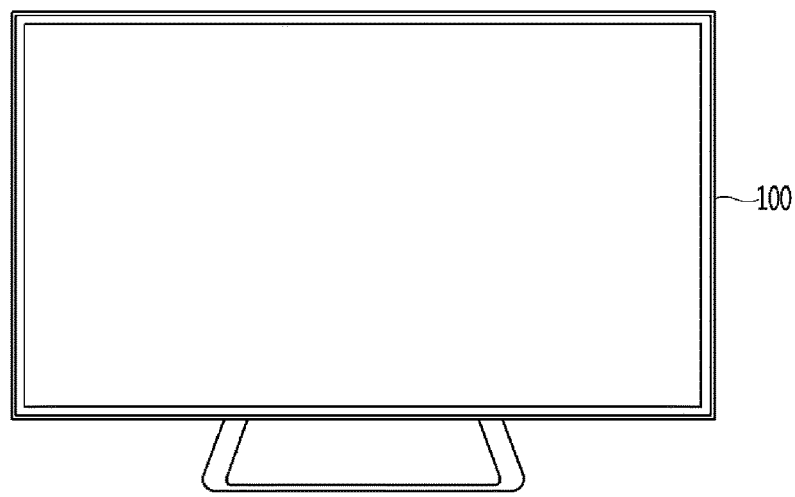
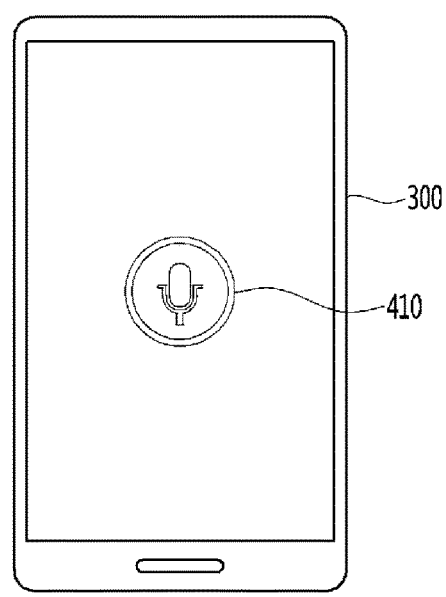

VIDEO DISPLAY DEVICE AND OPERATION METHOD THEREFOR

CROSS-REFERENCE TO RELATED APPLICATIONS

This application is the National Stage filing under 35 U.S.C. 371 of International Application No. PCT/KR2014/006111, filed on Jul. 8, 2014, which claims the benefit of Korean Application No. 10-2014-0073438, filed on Jun. 17, 2014, the contents of which are all hereby incorporated by reference herein in their entirety.

TECHNICAL FIELD

The present invention relates to a video display device and an operating method thereof, and more particularly, a video display device, which recognizes a user voice and performs a control operation corresponding to the recognized voice, and an operating method thereof.

BACKGROUND ART

Recently, a digital TV service using a wired or wireless communication network has become common. The digital TV service can provide various services that could not be provided in an existing analog broadcast service.

For example, an Internet Protocol Television (IPTV), which is a type of a digital TV service, provides bi-directionality that allows a user to actively select a type of a program to be viewed, a viewing time, and the like. The IPTV service may provide various additional services based on the bi-directionality, for example, Internet browsing, home shopping, online games, and the like.

On the other hand, voice recognition technology has been applied to a TV. Accordingly, a user can control the operation of the TV through his or her voice. However, if a position where the user issues a voice command is far away from the TV, the TV may not accurately recognize the voice of the user. In order to solve such problem, a microphone is installed in a remote control device of the TV. Accordingly, a user can input a voice command through the microphone installed in the remote control device. However, there is a limitation in that the user has to issue a voice command while holding the remote control device.

DISCLOSURE OF THE INVENTION

Technical Problem

The present invention is directed to improving a voice recognition rate by receiving a plurality of voice signals for a user voice from a peripheral device connected to a video display device.

Additionally, the present invention is directed to recognizing a user voice based on a voice signal having highest quality among voice signals received from a plurality of peripheral devices.

Technical Solution

In one embodiment, a method for operating a video display device includes: transmitting a voice acquisition command signal to at least one peripheral device connected to the video display device; receiving at least one voice signal for a user voice acquired by at least one peripheral device having received the voice acquisition command signal, and a voice signal for the user voice acquired by the video display device; comparing the plurality of acquired voice signals with each other; determining a voice signal subjected to voice recognition based on the comparison result; recognizing the user voice based on the determined voice signal; and performing a control operation corresponding to the recognized voice.

In another embodiment, a video display device includes: a voice acquisition unit configured to acquire a user voice; a communication unit configured to perform communication with at least one peripheral device connected to the video display device; and a control unit configured to transmit a voice acquisition command signal to the at least one peripheral device, compare at least one voice signal for a user voice acquired by the at least one peripheral device with a voice signal acquired by the voice acquisition unit, determine a voice signal subjected to voice recognition based on the comparison result, recognize the user voice based on the determined voice signal, and perform a control operation corresponding to the recognized voice.

Advantageous Effects

According to various embodiments of the present invention, a plurality of voice signals for a user voice can be acquired, and the user voice can be recognized based on the plurality of acquired voice signals.

Additionally, according to the present invention, since a voice signal for a user voice can be acquired from a peripheral device connected to a video display device, it is possible to improve a voice recognition rate with respect to a voice of a user located at a remote distance.

BRIEF DESCRIPTION OF THE DRAWINGS

FIG. 14 is a view illustrating an example of user voice signal acquisition according to an embodiment of the present invention.

MODE FOR CARRYING OUT THE INVENTION

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

Hereinafter, a screen display control method and a video display device using the same will be described in detail with reference to the accompanying drawings.

A video display device according to an embodiment of the present invention is, for example, an intelligent video display device in which a computer support function is added to a broadcast reception function. An Internet function or the like is added to the video display device that fundamentally has the broadcast reception function. Accordingly, the video display device may include an easy-to-use interface, such as a handwriting input device, a touch screen, or a spatial remote control device. With the support of a wired or wireless Internet function, the video display device can connect to the Internet and computers and perform functions such as e-mail, web browsing, banking, or games. In order to perform such various functions, standardized general-purpose OS may be used.

Accordingly, since various applications are freely added or deleted on a general purpose OS kernel, a display device described herein can perform various user-friendly functions. More specifically, the video display device may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
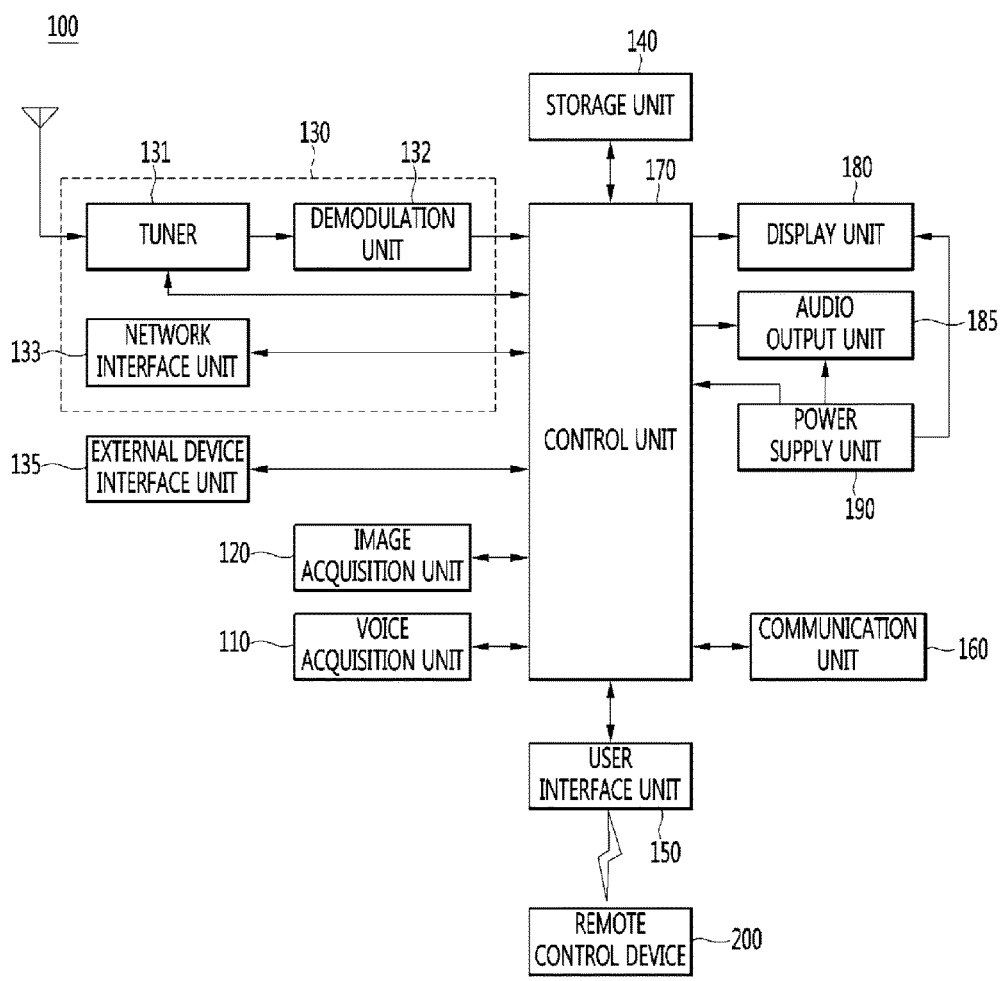
FIG. 1 is a block diagram illustrating a configuration of a video display device according to an embodiment of the present invention.

FIG. 1 is a block diagram illustrating a configuration of a video display device according to an embodiment of the present invention.

Referring to FIG. 1, the video display device 100 may include a voice acquisition unit 110, an image acquisition unit 120, a broadcast reception unit 130, an external device interface unit 135, a storage unit 140, a user input interface 150, a communication unit 160, a control unit 170, a display unit 180, an audio output unit 185, and a power supply unit 190.

The voice acquisition unit 110 may acquire a voice.

The voice acquisition unit 110 may include at least one microphone and may acquire a voice through the at least one microphone.

The voice acquisition unit 110 may transfer the acquired voice to the control unit 170.

The image acquisition unit 120 may acquire an image.

The image acquisition unit 120 may include at least one camera and may acquire an image through the at least one camera.

The image acquisition unit 120 may transfer the acquired image to the control unit 170.

The broadcast reception unit 130 may include a tuner 131, a demodulation unit 132, and a network interface unit 133.

The external device interface unit 135 may receive an application or an application list of an adjacent external device and transfer the application or the application list to the control unit 170 or the storage unit 140.

The external device interface unit 135 may include a terminal for connection to the external device and may be connected to a connecter of the external device.

The external device interface unit 135 may supply power received from the power supply unit 190 to the connected external device as driving power.

Additionally, the external device interface unit 135 may transfer an operation signal transmitted by the external device to the control unit 170.

On the contrary, the external device interface unit 135 may transfer a voice signal transmitted by the control unit 170 to the external device.

On the other hand, the external device interface unit 135 may include a sensor configured to sense a connection of the external device and may recognize the connection of the external device.

The network interface unit 133 may provide an interface for connecting the video display device 100 to a wired/wireless network including an Internet network. The network interface unit 133 may transmit/receive data to/from another user or another electronic device via the connected network or another network linked to the connected network.

Additionally, the network interface unit 133 may transmit a part of content data stored in the video display device 100 to a user or an electronic device selected from other users or other electronic devices preregistered in the video display device 100.

The network interface unit 133 may connect to a predetermined webpage via the connected network or another network linked to the connected network. That is, the network interface unit 133 may connect to the predetermined webpage via the network and transmit/receive data to/from a corresponding server.

The network interface unit 133 may receive content or data provided by a content provider or a network operator. That is, the network interface unit 133 may receive content (e.g., movies, advertisements, games, VOD, broadcast signals, etc.) and content-related information provided from the content provider or the network operator, via the network.

Additionally, the network interface unit 133 may receive update information and update files of firmware provided by the network operator and may transmit data to the Internet or content provider or the network operator.

The network interface unit 133 may select and receive a desired application among applications, which are open to the public, via the network.

The storage unit 140 may store a program for signal processing and control in the control unit 170 and may store signal-processed image, voice, or data signals.

Additionally, the storage unit 140 may perform a function for temporarily storing images, voices, or data signals input from the external device interface unit 135 or the network interface unit 133 and may store information on a predetermined image through a channel storage function.

The storage unit 140 may store an application or an application list input from the external device interface unit 135 or the network interface unit 133.

The video display device 100 may reproduce content files (e.g., moving image files, still image files, music files, document files, application files, etc.) stored in the storage unit 140 so as to provide the content files to the user.

The user input interface unit 150 may transfer a signal input by the user to the control unit 170 or may transfer a signal input from the control unit 170 to the user. For example, the user input interface unit 150 may process a control signal for power on/off, channel selection, screen setting, or the like, which is received from the remote control device 200, or transmit the control signal from the control unit 170 to the remote control device 200, according to various communication schemes such as Bluetooth scheme, an Ultra Wideband (WB) scheme, a ZigBee scheme, a Radio Frequency (RF) communication scheme, or an infrared (IR) communication scheme.

Additionally, the user input interface unit 150 may transfer, to the control unit 170, a control signal input from a power key, a channel key, a volume key, or a local key (not shown) such as a setting value.

The communication unit 160 may include one or more modules that enable wired communication or wireless communication between the video display device 100 and the network or between the video display device 100 and the peripheral device. The peripheral device may include at least one of the remote control device 200 and a terminal 300 to be described below.

For example, the communication unit 160 may include an Internet module for Internet connection and may allow the video display device 100 to connect to the Internet through the Internet module via the wired or wireless communication.

In another example, the communication unit 160 may include a short-range communication module that enables wireless communication between the video display device 100 and another device. According an embodiment, the short-range communication module included in the communication unit 160 may use Bluetooth, Radio Frequency Identification (RFID), infrared Data Association (IrDA), Ultra Wideband (UWB), ZigBee, Wireless LAN (WLAN) (Wi-Fi), or the like.

The image signal that is image-processed by the control unit 170 may be input to the display unit 180, and an image corresponding to the image signal may be displayed thereon. Additionally, the image signal that is image-processed by the control unit 170 may be input to an external output device through the external device interface unit 135.

The voice signal that is processed by the control unit 170 may be output to the audio output unit 185. Additionally, the voice signal that is processed by the control unit 170 may be input to an external device through the external device interface unit 135.

In addition, the control unit 170 may control an overall operation of the video display device 100.

The control unit 170 may receive a sensing signal related to the connection of the external device from the external device interface unit 135 and control the power supply unit 190 to transfer driving power to the connected external device through the external device interface unit 135.

Additionally, the control unit 170 may recognize the voice acquired through the voice acquisition unit 110 and perform a control operation corresponding to the recognized voice.

The control unit 170 may compare a plurality of voice signals for a user voice, recognize a voice of a voice signal having the highest quality, and perform a control operation corresponding to the recognized voice.

The control unit 170 may determine a position of a user by comparing a plurality of voices acquired from the voice acquisition unit 110 including a plurality of microphones. Specifically, the control unit 170 may determine a position of a user who utters a voice by comparing voices acquired by the plurality of microphones.

On the other hand, the control unit 170 may control the video display device 100 by a user command input through the user input interface unit 150 or an internal program and may connect to the network to download an application or an application list desired by the user into the video display device 100.

The control unit 170 may output channel information selected by the user through the display unit 180 or the audio output unit 185 together with the processed image or voice signal.

Additionally, the control unit 170 may output the image signal or the voice signal, which is input from the external device (e.g., a camera or a camcorder) through the external device interface unit 135, to the display unit 180 or the audio output unit 185 according to an external device image reproduction command received through the user input interface unit 150.

On the other hand, the control unit 170 may control the display unit 180 to display an image. For example, the control unit 170 may control the display unit 180 to display a broadcast image input through the tuner 131, an external input image input through the external device interface unit 135, an image input through the network interface unit, or an image stored in the storage unit 140. In this case, the image displayed on the display unit 180 may be a still image or a moving image, or may be a 2D image or a 3D image.

Additionally, the control unit 170 may perform control to reproduce content stored in the video display device 100, received broadcast content, or external input content input from the outside. The content may be various types, such as a broadcast image, an external input image, an audio file, a still image, a connected web screen, a document file, and the like The display unit 180 may generate a driving signal by converting an image signal, a data signal, or an OSD signal, which is processed by the control unit 170, or an image signal or a data signal, which is received by the external device interface unit 135, into R, G, and B signals.

On the other hand, the video display device 100 shown in FIG. 1 is merely one embodiment of the present invention, and some of the illustrated components may be integrated, added, or omitted according to a specification of the video display device 100 to be actually implemented.

That is, if necessary, two or more components may be integrated into one component, or one component may be divided into two or more components. Additionally, the functions performed in each block are provided for describing the embodiments of the present invention, and specific operations or devices do not limit the scope of the present invention.

According to another embodiment of the present invention, the video display device 100 may not include the tuner 131 and the demodulation unit 132, unlike that illustrated in FIG. 1, and may receive an image through the network interface unit 133 or the external device interface unit 135 and reproduce the received image.

For example, the video display device 100 may be implemented by separate devices, that is, an image processing device such as a set-top box for receiving a broadcast signal or content provided by various network services, and a content reproduction device for reproducing content input from the video processing device.

In this case, an image display method according to an embodiment of the present invention, which will be described below, may be performed by the video display device 100 described above with reference to FIG. 1, or may be performed by one of the image processing device such as the set-top box and the content reproduction device including the display unit 180 and the audio output unit 185.

Next, the remote control device according to an embodiment of the present invention will be described with reference to FIGS. 2 and 3.

Figure 2:
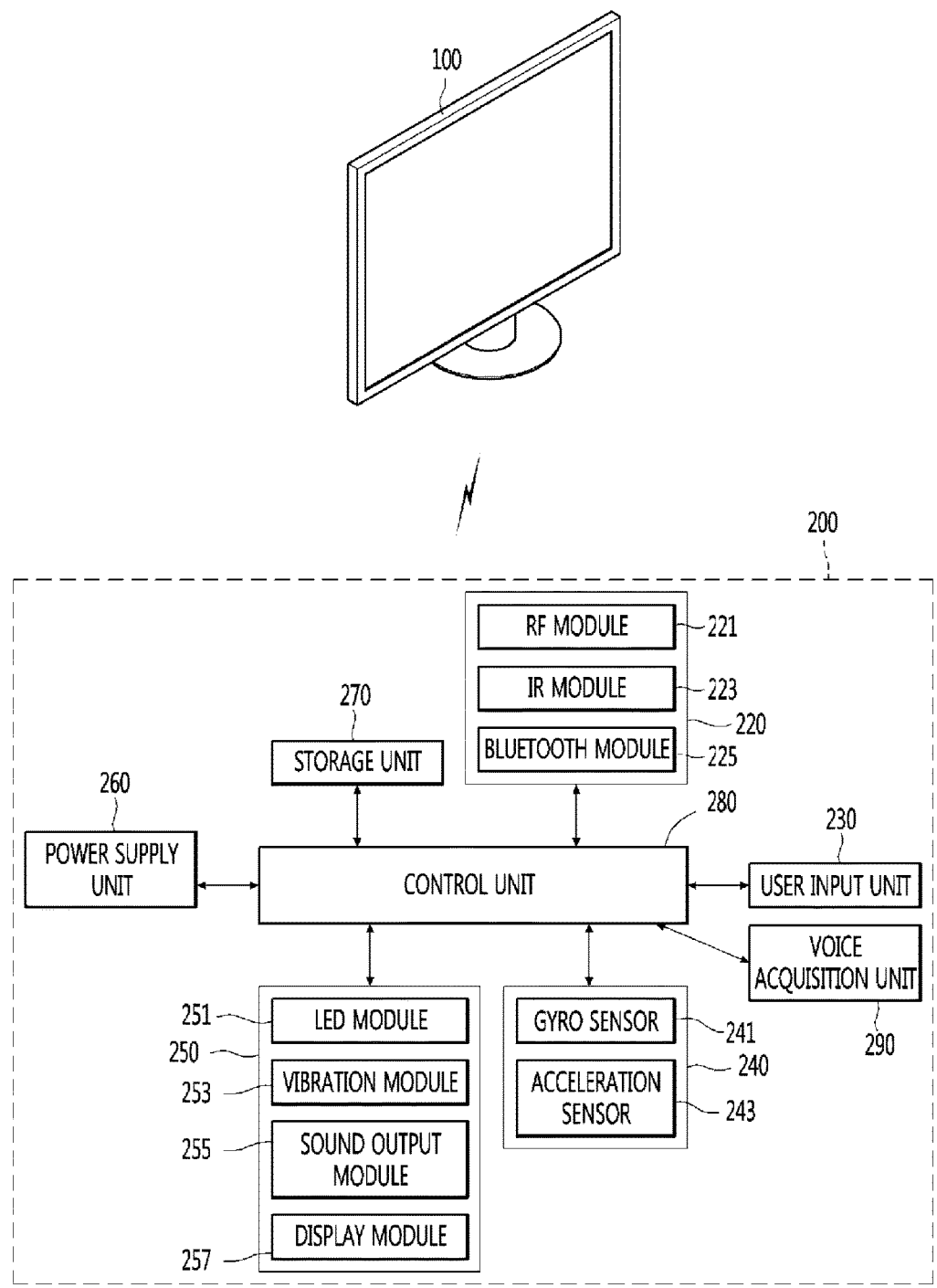
FIG. 2 is a block diagram of a remote control device according to an embodiment of the present invention.
Figure 3:
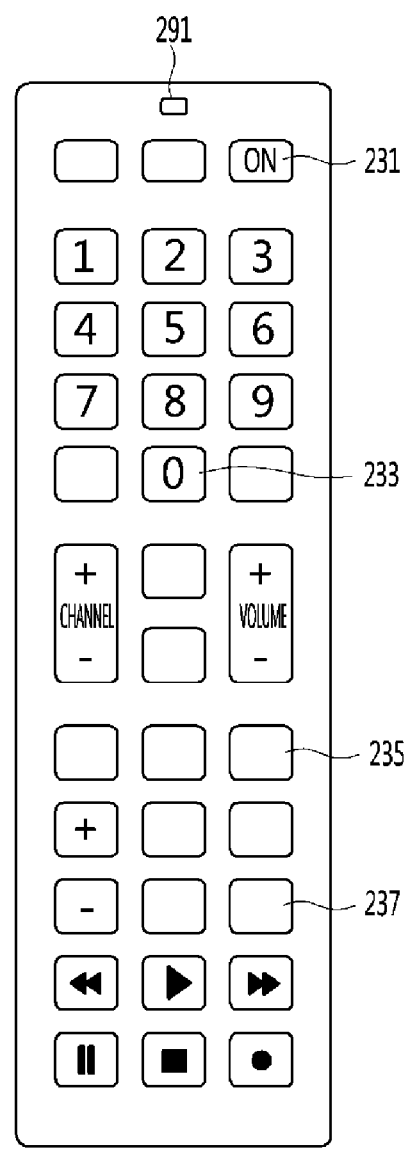
FIG. 3 illustrates an actual configuration example of the remote control device according to an embodiment of the present invention.

FIG. 2 is a block diagram of the remote control device according to an embodiment of the present invention, and FIG. 3 illustrates an actual configuration example of the remote control device according to an embodiment of the present invention.

First, referring to FIG. 2, the remote control device 200 may include a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits a signal to and receives a signal from any one of the video display devices according to the aforementioned embodiments of the present invention.

The remote control device 200 may include an RF module 221 configured to transmit a signal to and receive a signal from the video display device 100 according to an RF communication standard, and an IR module 223 configured to transmit a signal to and receive a signal from the video display device 100 according to an IR communication standard. Additionally, the remote control device 200 may include a Bluetooth module 225 configured to transmit a signal to and receive a signal from the video display device 100 according to a Bluetooth communication standard.

Additionally, the remote control device 200 transmits a signal including information on a movement of the remote control device 200 to the video display device 100 through the RF module 221 or the Bluetooth module 225.

On the other hand, the remote control device 200 may receive a signal transmitted by the video display device 100 through the RF module 221 or the Bluetooth module 225 and, if necessary, may transmit a command for power on/off, channel change, volume change, or the like to the video display device 100 through the IR module 223 or the Bluetooth module 225.

The user input unit 230 may include a keypad, a button, a touch pad, or a touch screen. The user may manipulate the user input unit 230 to input a command relating to the video display device 100 to the remote control device 200. When the user input unit 230 includes a hard key button, the user may push the hard key button to input a command relating to the video display device 100 to the remote control device 200. This will be described below with reference to FIG. 3.

Referring to FIG. 3, the remote control device 200 may include a plurality of buttons. The plurality of buttons may include a power button 231, a channel button 233, a voice recognition button 235, and a live button 237.

The power button 231 may be a button for tuning on or off the power of the video display device 100.

The channel button 233 may be a button for receiving a broadcast signal of a specific broadcast channel.

The voice recognition button 235 may be a button for recognizing a user voice.

The live button 297 may be a button for displaying a broadcast program in real time.

Again, FIG. 2 is described.

If the user input unit 230 includes a touch screen, a user can touch a soft key of the touch screen to input a command relating to the video display device 100 to the remote control device 200. Additionally, the user input unit 230 may include various types of input means manipulated by a user, for example, a scroll key or a jog key, and this embodiment does not limit the scope of the present invention.

The sensor unit 240 may include a gyro sensor 241 or an acceleration sensor 243, and the gyro sensor 241 may sense information on a movement of the remote control device 200.

For example, the gyro sensor 241 may sense information on an operation of the remote control device 200 on the basis of x, y, and z axes, and the acceleration sensor 243 may sense information on a movement speed of the remote control device 200. Moreover, the remote control device 200 may further include a distance measurement sensor and sense a distance with respect to the display unit 180 of the display device 100.

The output unit 250 may output image or voice signals in response to manipulation of the user input unit 235 or image or voice signals corresponding to signals transmitted from the video display device 100. A user can recognize whether the user input unit 235 is manipulated or the video display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the video display device 100 through the wireless communication unit 220.

Additionally, the power supply unit 260 supplies power to the remote control device 200 and, if the remote control device 200 does not move for a predetermined time, stops the power supply, so that power waste can be reduced. The power supply unit 260 may resume the power supply if a predetermined key provided at the remote control device 200 is manipulated.

The storage unit 270 may store various kinds of programs and application data necessary for control or operation of the remote control device 200. If the remote control device 200 transmits/receives signals wirelessly through the video display device 100 and the RF module 221, the remote control device 200 and the video display device 100 transmits/receives signals through a predetermined frequency band.

The control unit 280 of the remote control device 200 may store, in the storage unit 270, information on a frequency band for transmitting/receiving signals wirelessly to/from the video display device 100 paired with the remote control device 200 and refer to the information.

The control unit 280 controls general matters relating to control of the remote control device 200. The control unit 280 may transmit a signal corresponding to a predetermined key manipulation of the user input unit 230 or a signal corresponding to a movement of the remote control device 200 sensed by the sensor unit 240 to the video display device 100 through the wireless communication unit 220.

Additionally, the voice acquisition unit 290 of the remote control device 200 may obtain voice.

The voice acquisition unit 290 may include at least one microphone 291 and acquire voice through the microphone 291.

The voice acquisition unit 290 may transfer the acquired voice to the control unit 280.

Referring to FIG. 3, the voice acquisition unit 290 may include the microphone 291 on a front surface of the remote control device 200 and acquire voice through the microphone 291.

Additionally, the voice acquisition unit 290 may include a plurality of microphones 291 and acquire voice through each of the plurality of microphones 291.

According to an embodiment, the microphones 291 may be provided on at least one of a front surface, a side surface, and a rear surface of the remote control device 200, and the voice acquisition unit 290 may acquire voice through the at least one microphone 291.

Next, the terminal 300 according to an embodiment of the present invention will be described with reference to FIG. 4.

Figure 4:
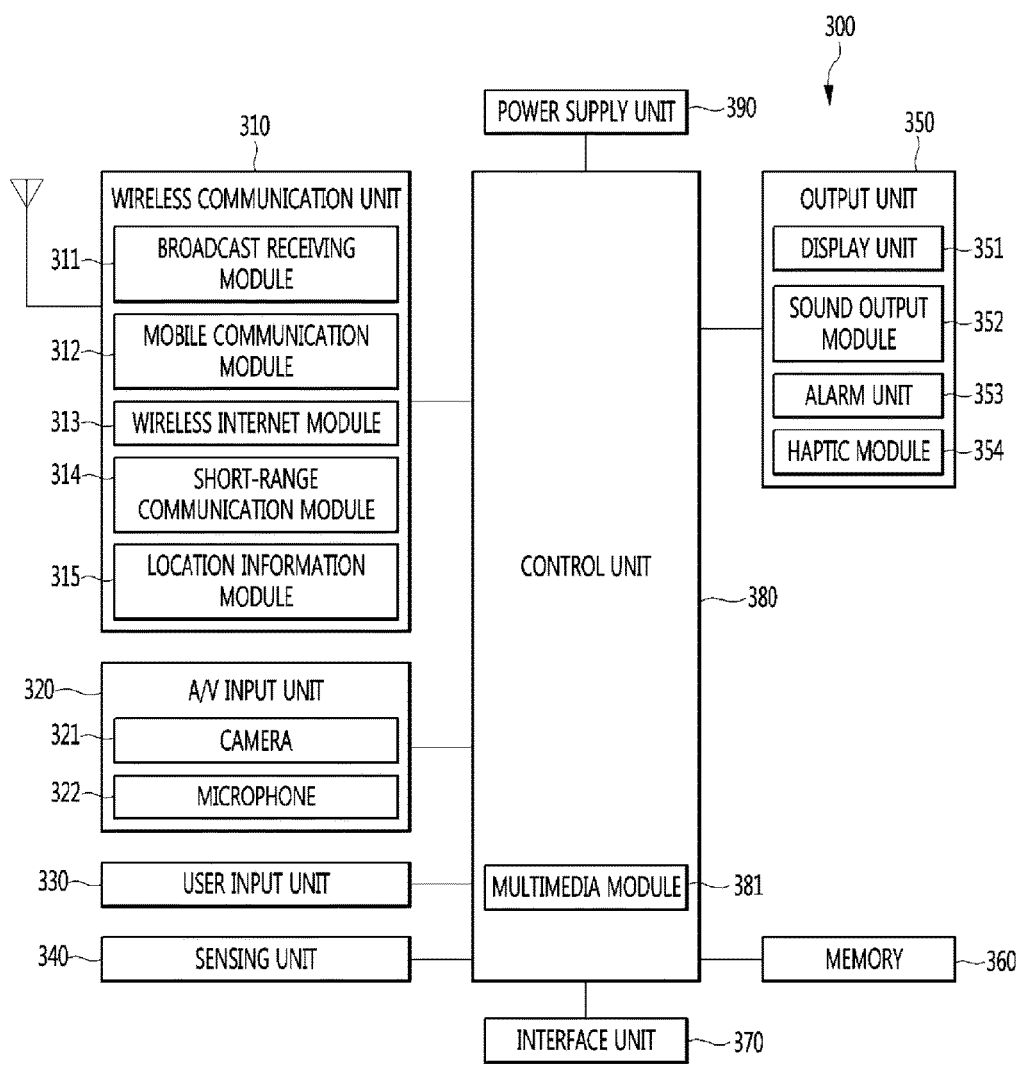
FIG. 4 is a block diagram of a terminal according to an embodiment of the present invention.

FIG. 4 is a block diagram of the terminal 300 according to an embodiment of the present invention.

Referring to FIG. 4, the terminal 300 may include a wireless communication unit 310, an audio/video (A/V) input unit 320, a user input unit 330, a sensing unit 340, an output unit 350, a memory 360, an interface unit 370, a control unit 380, and a power supply unit 390. All components shown in FIG. 4 may not be necessary, so that the terminal 300 may include components less or more than the components listed above.

Hereinafter, the components will be described in sequence.

The communication unit 310 may include one or more modules enabling wireless communication between the terminal 300 and the network or between the terminal 300 and the video display device 100. For example, the wireless communication unit 310 may include at least one of a broadcast receiving module, a mobile communication module, a wireless Internet module, a short-range communication module, and a location information module.

The A/V input unit 320 is used to input audio signals or video signals and may include a camera 321 and a microphone 322. The camera 321 may process an image frame, such as a still image or a moving image, which is acquired by an image sensor in a video call mode or a photographing mode. The processed image frame may be displayed on the display unit 351.

The image frame processed by the camera 321 may be stored in the memory 360 or may be transmitted to the outside through the wireless communication unit 310. The camera 321 may include two or more cameras according to a use environment.

The microphone 322 receives an external sound signal in a call mode, a record mode, a voice recognition mode, or the like and processes the received external sound signal into electrical sound data. In the call mode, the processed sound data may be converted into a format that is transmittable to a mobile communication base station through the mobile communication unit 310, and then be output. The microphone 322 may use various noise removal algorithms for removing noise generated in the process of receiving the external sound signals. The microphone 322 may include two or more microphones according to a use environment.

The user input unit 330 generates input data that allows the user to control the operation of the terminal 300. The user input unit 330 may include a keypad, a dome switch, a (resistive type/capacitive type) touch pad, a jog wheel, a jog switch, and the like.

The sensing unit 340 senses a current state of the terminal 300, such as an opened or closed state of the terminal 300, a location of the terminal 300, a contact or non-contact of a user, an orientation of the mobile terminal, or acceleration/deceleration of the mobile terminal, and generates a sensing signal for controlling the operation of the terminal 300. For example, when the terminal 300 is a slide type phone, the sensing unit 340 may sense whether the terminal 300 is opened. Additionally, the sensing unit 340 may sense whether the power is supplied, whether the interface unit 370 is connected to an external deice, and the like.

Additionally, the sensing unit 340 may include a proximity sensor 341.

The output unit 350 is used to generate a visual, auditory, or haptic output and may include a display unit 351, a sound output module 352, an alarm unit 353, and a haptic module 354.

The display unit 351 displays (outputs) information processed by the terminal 300. For example, in the call mode, the terminal 300 displays a user interface (UI) or a graphic user interface (GUI) related to a call. In the video call mode or the photographing mode, the terminal 300 takes a photograph and/or displays a received image, a UI, or GUI.

The display unit 351 may include at least one of a liquid crystal display (LCD), a thin film transistor-liquid crystal display (TFT LCD), an organic light-emitting diode (OLED), a flexible display, and a 3D display.

In a case where the display unit 351 and a sensor (hereinafter, referred to as a "touch sensor") 344 sensing a touch action form a mutual layer structure (hereinafter, referred to as "touch screen"), the display unit 351 may also be used as an input device as well as the output device. The touch sensor 344 may have the form of, for example, a touch film, a touch sheet, or a touch pad.

The touch sensor 344 may be configured such that a pressure applied to a specific portion of the display unit 351 or a change in a capacitance occurring in a specific portion of the display unit 351 is converted into an electrical input signal. The touch sensor 344 may be configured to detect a touch pressure as well as a touch position and a touch area.

When there is a touch pressure on the touch sensor 344, signal(s) corresponding thereto is(are) transmitted to a touch controller. The touch controller processes the signal(s) and then transmits corresponding data to the control unit 380. Therefore, the control unit 380 can recognize which area of the display unit 351 is touched.

The sound output module 352 may output audio data received from the wireless communication unit 310 in a call signal reception mode, a call mode or a record mode, a voice recognition mode, and a broadcast reception mode, or may output audio data stored in the memory 360. The audio output module 352 may output audio signals relating to functions performed in the terminal 300 (for example, call signal reception sound, message reception sound, etc.). The sound output module 352 may include a receiver, a speaker, and a buzzer.

The alarm unit 353 may output a signal for notifying an event occurring in the terminal 300. Examples of the event occurring in the terminal 300 include a call signal reception, a message reception, a key signal input, and a touch input. The alarm unit 353 may output a signal for notifying an event occurrence by methods other than video signals or audio signals, for example, by way of vibration. The video signals or audio signals may be output through the display unit 351 or the voice output module 352. Therefore, the display unit 351 and the voice output module 352 may be classified as a part of the alarm unit 353.

The haptic module 354 generates various haptic effects that a user can feel. A representative example of the haptic effect that the haptic module 354 generates is vibration. The intensity and pattern of the vibration generated by the haptic module 354 may be controlled. For example, the haptic module 354 may synthesize and output different vibrations or output different vibrations sequentially.

The memory 360 may store a program for the operation of the control unit 380 and may temporarily store input/output data (for example, a phone book, a message, a still image, and a moving image). The memory 360 may store data about various patterns of vibrations and sounds output during the touch input on the touch screen.

The memory 360 may include at least one storage medium selected from among a flash memory, a hard disk, a multimedia card micro type memory, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk. The terminal 300 may operate in relation to a web storage that performs a storage function of the memory 360 on Internet.

The interface unit 370 serves as a path to all external devices connected to the terminal 300. The interface unit 370 may receive data from the external device, may receive power and transmit the power to each component of the terminal 300, or may transmit internal data of the terminal 300 to the external device. For example, the interface unit 370 may include a wired/wireless headset port, an external charger port, a wired/wireless data port, a memory card port, a port for connecting a device equipped with an identification module, an audio I/O port, a video I/O port, and an earphone port.

The identification module, as a chip storing a variety of information for authenticating usage authority of the terminal 300, may include a user identity module (UIM), a subscriber identity module (SIM), and a universal subscriber identity module (USIM). A device equipped with an identification module (hereinafter, referred to as an identification device) may be manufactured in a smart card form. Accordingly, the identification device may be connected to the terminal 300 through a port.

The control unit 380 controls an overall operation of the terminal 300. For example, the control unit 380 performs control and processing relating to a voice call, data communication, video call, and the like. The control unit 380 may include a multimedia module 381 for multimedia reproduction. The multimedia module 381 may be implemented within the control unit 380, or may be implemented separately from the control unit 380.

The control unit 380 may perform pattern recognition processing for recognizing handwriting input or drawing input on the touch screen as a text and an image, respectively.

Under the control of the control unit 380, the power supply unit 390 receives external power or internal power and supplies power necessary for the operation of each component.

Hereinafter, the operating method of the video display device 100 will be described with reference to FIGS. 5 and 6.

Figure 5:
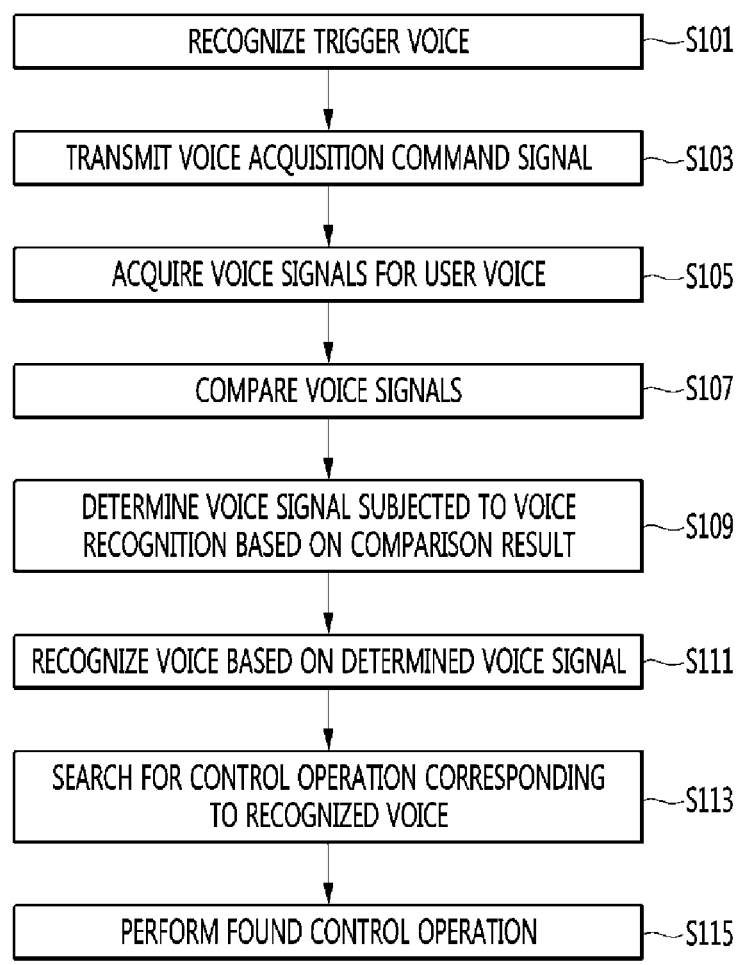
FIG. 5 is a flowchart of an operating method of a video display device according to an embodiment of the present invention.

FIG. 5 is a flowchart of the operating method of the video display device 100 according to an embodiment of the present invention.

Figure 6:
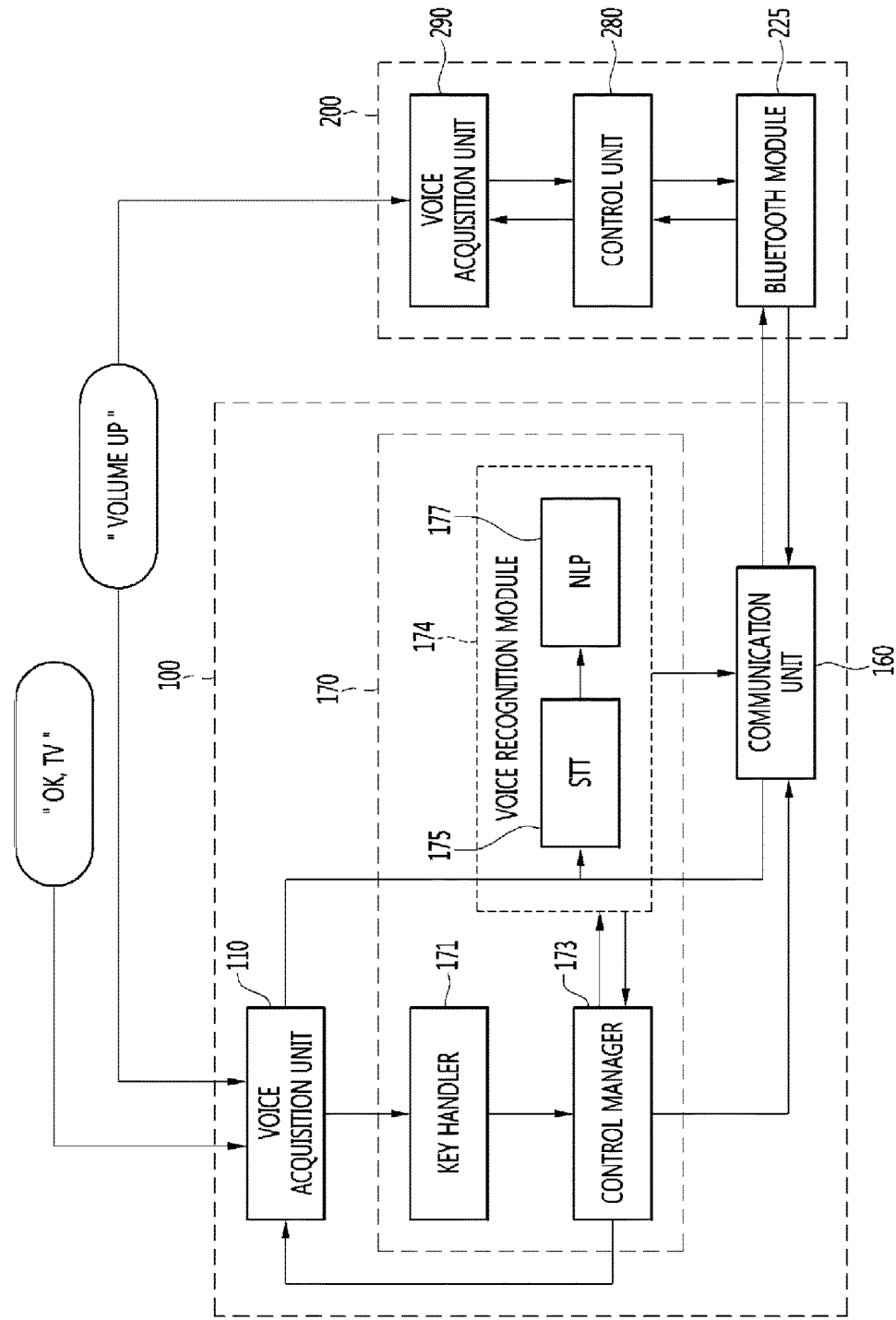
FIG. 6 is a view illustrating an example of the operating method of the video display device according to an embodiment of the present invention.

FIG. 6 is a view illustrating an example of the operating method of the video display device 100 according to an embodiment of the present invention.

Referring to FIG. 5, the video display device 100 recognizes a trigger voice for recognizing a user voice (S101).

The video display device 100 may acquire a user voice through the voice acquisition unit 110 and recognize a trigger voice for recognizing the user voice.

The trigger voice may be a voice used when the video display device 100 enters a specific operation or a specific mode.

According to an embodiment, the video display device 100 may acquire a voice containing "Ok, TV", which is a preset trigger voice, and may recognize the acquired voice as the trigger voice.

Specifically, the video display device 100 may acquire a voice uttered by a user through the voice acquisition unit 110. The voice acquisition unit 110 of the video display device 100 may transfer the acquired voice to the control unit 170. The control unit 170 may recognize the acquired voice and compare the recognized voice with a prestored trigger voice. When the recognized voice matches the prestored trigger voice, the control unit 170 may determine that the acquired voice as the trigger voice. Accordingly, the video display device 100 may recognize the trigger voice in the acquired voice.

Hereinafter, the trigger voice recognition of the video display device 100 will be described with reference to FIG. 6.

Referring to FIG. 6, the voice acquisition unit 110 of the video display device 100 may acquire the users' trigger voice "Ok, TV". The voice acquisition unit 110 may transfer the acquired trigger voice to a key handler 171 included in the control unit 170 of the video display device 100. The key handler 171 may recognize the received trigger voice "Ok, TV". The trigger voice may be a preset voice. Operation S101 of recognizing the trigger voice in the video display device 100 may be omitted if necessary.

Again, FIG. 5 is described.

The video display device 100 transmits a voice acquisition command signal from at least one of the remote control device 200 and the terminal 300 linked thereto (S103).

The video display device 100 may transmit the voice acquisition command signal that allows at least one of the remote control device 200 and the terminal 300, which are the linked peripheral devices, to recognize the user voice.

Specifically, the control unit 170 of the video display device 100 may generate the voice acquisition command signal based on the recognized trigger voice. The communication unit 160 of the video display device 100 may transmit the generated voice acquisition command signal to at least one of the remote control device 200 and the terminal 300, which are the linked peripheral devices. Accordingly, at least one peripheral device of the remote control device 200 and a terminal 300 receiving the voice acquisition command signal may acquire the user voice.

The voice acquisition command signal transmission of the video display device 100 will be described in detail with reference to FIG. 6.

Referring to FIG. 6, the key handler 171 may transmit a trigger voice recognition signal to a control manager 173 included in the control unit 170. The trigger voice recognition signal may be a signal indicating that the trigger voice has been recognized. The control manager 173 may transmit the voice acquisition command signal, which instructs the voice acquisition unit 110 and the remote control device 200 to acquire the user voice, based on the trigger voice recognition signal. Accordingly, the video display device 100 may transmit the voice acquisition command signal to the remote control device 200 through the communication unit 160. The Bluetooth module 225 of the remote control device 200 may receive the voice acquisition command signal from the communication unit 160 of the video display device 100. The Bluetooth module 225 may transfer the voice acquisition command signal to the control unit 280. The control unit 280 may transmit the voice acquisition command signal to the voice acquisition unit 290, so that the voice acquisition unit 290 acquires the user voice.

Additionally, the video display device 100 may transmit the voice acquisition command signal to at least one peripheral device of a plurality of remote control devices 200 and a plurality of terminals 300.

If necessary, at least one of the remote control device 200 and the terminal 300, which are the peripheral devices linked to the video display device 100, may experience a link process for linking to the video display device 100. Since the process of linking the video display device 100 to the remote control device 200 or the terminal 300 is a known technology, detailed descriptions thereof will be omitted.

Additionally, the video display device 100 may transmit a check signal for checking an operation state of at least one of the remote control device 200 and the terminal 300, which are the linked peripheral devices, and receive a response signal with respect to the transmitted check signal. Accordingly, the video display device 100 may check the operation state of at least one of the remote control device 200 and the terminal 300, which are the linked peripheral devices. For example, the video display device 100 may check whether at least one of the remote control device 200 and the terminal 300 performs the voice acquisition operation.

Again, FIG. 5 is described.

The video display device 100 acquires a plurality of voice signals for the user voice (S105).

The video display device 100 may acquire a plurality of voice signals for a voice uttered by a user. The plurality of voice signals may mean voice signals acquired from at least one of the video display device 100, the remote control device 200, and the terminal 300.

Specifically, the video display device 100 may acquire the user voice through the voice acquisition unit 110 included in the video display device 100 and acquire voice signals for the acquired user voice. According to an embodiment, the user voice may be acquired through the microphone included in the voice acquisition unit 110 of the video display device 100, and the voice signals for the acquired voice may be acquired.

According to another embodiment, the video display device 100 may acquire the plurality of voice signals for the user voice through the plurality of microphones included in the voice acquisition unit 110. The plurality of microphones may be located in different areas of the video display device 100.

Additionally, the video display device 100 may receive the voice signal for the user voice from the peripheral device that acquires the user voice, and may acquire the voice signal for the user voice.

Figure 7:
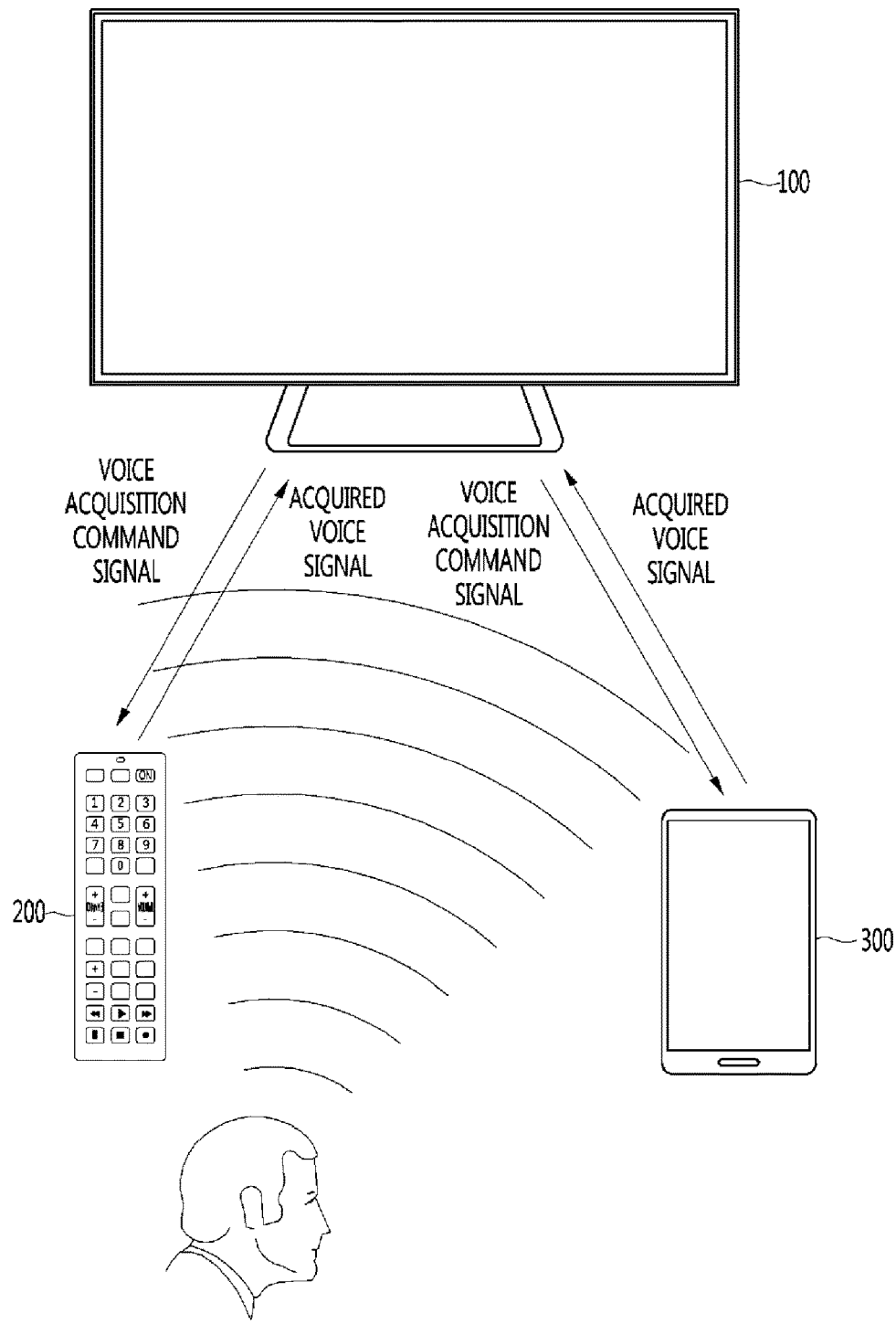
FIG. 7 is a view illustrating an example of voice signal acquisition for a user voice in the video display device according to an embodiment of the present invention.

Details thereof will be described with reference to FIGS. 6 to 8. FIG. 7 is a view illustrating an example of the voice signal acquisition for the user voice in the video display device according to an embodiment of the present invention.

Referring to FIG. 7, the video display device 100 may transmit the voice acquisition command signal that allows at least one of the remote control device 200 and the terminal 300, which are the peripheral devices linked to the video display device 100, to recognize the user voice in operation S103. At least one of the remote control device 200 and the terminal 300 receiving the voice acquisition command signal may acquire the user voice. At least one of the remote control device 200 and the terminal 300 having acquired the user voice transmits the voice signal for the acquired user voice to the video display device 100. The video display device 100 may receive the voice signal transmitted by at least one of the remote control device 200 and the terminal 300. The video display device 100 may acquire the voice signal of the user through the voice signal transmitted by at least one of the remote control device 200 and the terminal 300.

Accordingly, the video display device 100 may acquire a plurality of voice signals for the user voice through at least one of the video display device 100, the remote control device 200, and the terminal 300.

The acquisition of the plurality of voice signals for the user voice in the video display device 100 and the remote control device 200 will be described in detail with reference to FIG. 6.

Referring to FIG. 6, the voice acquisition unit 110 of the video display device 100 and the voice acquisition unit 290 of the remote control device 200 may acquire a user voice "Volume up". The voice acquisition unit 110 of the video display device 100 may transfer the acquired voice "Volume up" to the voice recognition module 174 of the control unit 170. The voice recognition module 174 of the control unit 170 may include Speech To Text (STT) 175 and Natural Language Processing (NLP) 177. The voice acquisition unit 290 of the remote control device 200 may acquire the user voice "Volume up". The voice acquisition unit 290 may transfer the acquired voice "Volume up" to the control unit 280. The control unit 280 may transfer the acquired voice to the video display device 100 through the Bluetooth module 225. Accordingly, the user voice "Volume up", which is acquired by the voice acquisition unit 290 of the remote control device 200, may be transferred to the voice recognition module 174 of the video display device 100.

Additionally, at least one of the video display device 100, the remote control device 200, and the terminal 300 may acquire the user voice through noise cancelling.

According to an embodiment, the video display device 100 may perform a noise cancelling operation by removing an area overlapping an output audio of the audio output unit 185 of the video display device 100 from the acquired voice.

According to another embodiment, the video display device 100 may perform a noise cancelling operation by removing an area having a certain level or less from the acquired voice.

The remote control device 200 also may perform a noise cancelling operation through the same operation as that of the video display device 100. Accordingly, the remote control device 200 may perform a noise cancelling operation by removing an area overlapping an output audio of the audio output unit 185 of the video display device 100 from the acquired voice or removing an area having a certain level or less from the acquired voice.

Additionally, the video display device 100 may receive the voice acquired by the remote control device 200 and perform the noise cancelling operation on the received voice.

Additionally, the remote control device 200 may perform the noise cancelling operation through comparison of the voices acquired through the plurality of microphones. Since the technology of noise cancelling through the plurality of microphones is a known technology, detailed descriptions thereof will be omitted.

The terminal 300 also may perform the above-described noise cancelling operation and may perform the noise cancelling operation through the same operation as that of the remote control device 200.

The video display device 100 may display information on the device acquiring the user voice.

According to an embodiment, the video display device 100 may display, on the display unit 180, an icon of at least one of the video display device 100, the remote control device 200, and the terminal 300 that are acquiring the user voice.

This will be described below with reference to FIG. 8.

Figure 8:
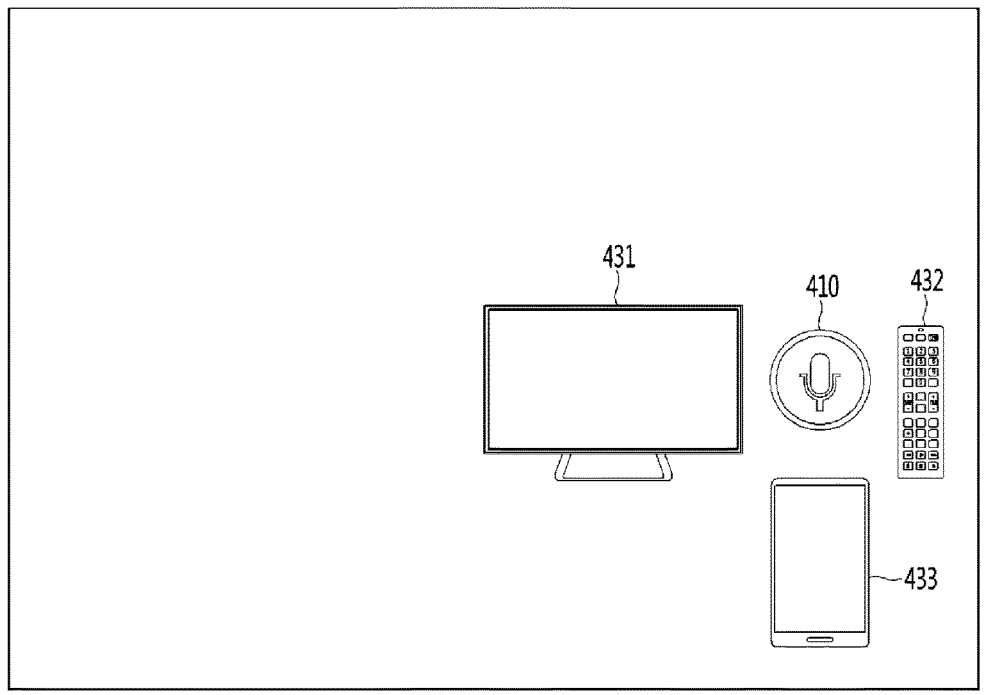
FIG. 8 illustrates an information display with respect to user voice acquisition of the video display device according to an embodiment of the present invention.

FIG. 8 illustrates an information display with respect to user voice acquisition of the video display device 100 according to an embodiment of the present invention.

Referring to FIG. 8, the video display device 100 may display information on the device acquiring the user voice in the form of an icon. Accordingly, the video display device 100 may display at least one of a voice acquisition icon 410 identifying that the user voice is being acquired, an icon 431 of video display devices that are the plurality of devices that are acquiring the user voice, an icon 432 of the remote control device, and an icon 433 of the terminal.

Again, FIG. 5 is described.

The video display device 100 compares the plurality of acquired voice signals (S107).

The control unit 170 of the video display device 100 may compare qualities of the plurality of acquired voice signals based on at least one of a user voice range level and a noise level of each of the plurality of acquired voice signals.

According to an embodiment, the control unit 170 may divide voice range levels corresponding to the user voice in the plurality of acquired voice signals (hereinafter, referred to as "user voice range levels") and compare the user voice range levels of the plurality of acquired voice signals.

According to another embodiment, the control unit 170 may divide voice range levels corresponding to noise in the plurality of acquired voice signals (hereinafter, referred to as "noise levels") and compare the noise levels of the plurality of acquired voice signals.

According to another embodiment, the control unit 170 may divide user voice range levels and noise levels in the plurality of acquired voice signals and compare the user voice range levels and the noise levels of the plurality of acquired voice signals.

Additionally, the control unit 170 may divide the plurality of acquired voice signals into constant sections and compare the plurality of acquired voice signals at each section.

The video display device 100 determines a voice signal subjected to voice recognition based on the comparison result (S109).

The control unit 170 of the video display device 100 may determine a voice signal subjected to voice recognition based on the comparison result of operation S107.

Specifically, the control unit 170 may determine the voice signal subjected to voice recognition based on at least one of a user voice range level and a noise level of each of the plurality of voice signals.

According to an embodiment, the control unit 170 may determine a voice signal having the highest user voice range level as the voice signal subjected to voice recognition.

According to another embodiment, the control unit 170 may determine a voice signal having the lowest noise level as the voice signal subjected to voice recognition among the plurality of voice signals.

According to further another embodiment, the control unit 170 may determine a voice signal having a high user voice range level and a low noise level as the voice signal subjected to voice recognition among the plurality of voice signals.

Additionally, the video display device 100 may display information on the device acquiring the user voice subjected to voice recognition.

According to an embodiment, the video display device 100 may display, on the display unit 180, an icon of the device acquiring a voice subjected to voice recognition among the plurality of voice signals.

This will be described below with reference to FIGS. 9 and 10.

Figure 9:
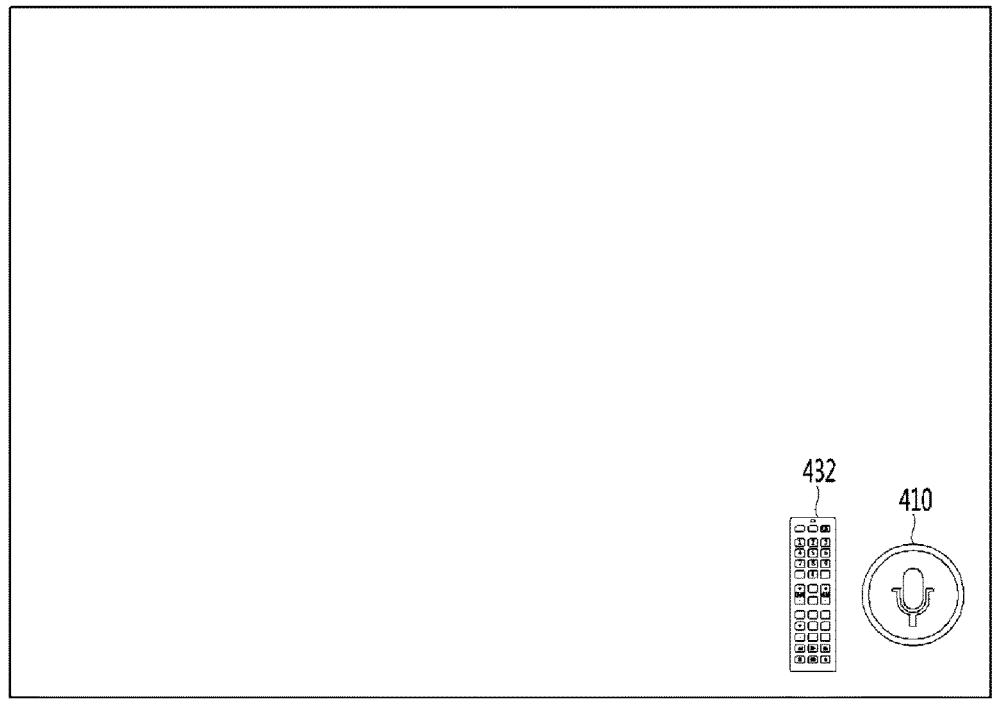
FIGS. 9 and 10 illustrate an information display with respect to user voice acquisition of the video display device according to an embodiment of the present invention.
Figure 10:
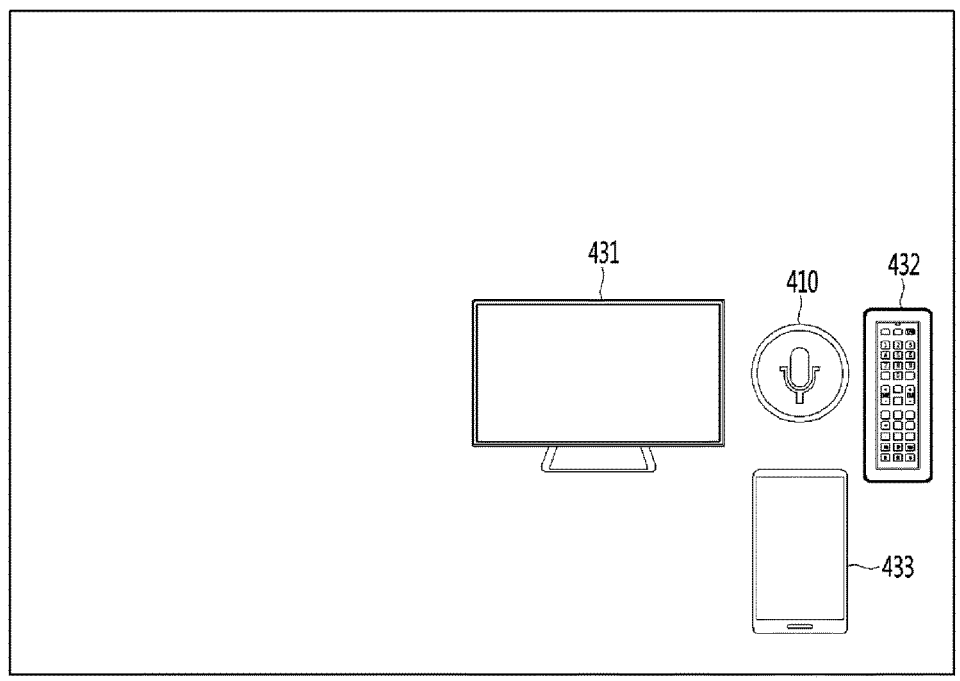

FIGS. 9 and 10 illustrate an information display with respect to user voice acquisition of the video display device 100 according to an embodiment of the present invention.

Hereinafter, it is assumed that the voice signal acquired by the remote control device 200 among the plurality of voice signals acquired by the video display device 100 is subjected to voice recognition.

According to an embodiment, referring to FIG. 9, the video display device 100 may display a voice acquisition icon 410 indicating that a user voice is being acquired, and an icon of the remote control device acquiring a user voice subjected to voice recognition.

According to another embodiment, referring to FIG. 10, the video display device 100 may display a voice acquisition icon 410 identifying that the user voice is being acquired, an icon 431 of video display devices that are the plurality of devices that are acquiring the user voice, an icon 432 of the remote control device, and an icon 433 of the terminal. The video display device 100 may display the icon 432 of the remote control device acquiring the user voice subjected to voice recognition differently from the icons 431 and 433 of the other devices. According to an embodiment, the video display device 100 may display an outline of the icon 432 of the remote control device differently from the icons 431 and 433 of the other devices. Additionally, the video display device 100 may display the icon of the device subjected to voice recognition differently from the icons of the other devices by using various methods.

Also, the video display device 100 may generate a new voice signal based on some sections of each of the plurality of acquired voice signals. The video display device 100 may determine the generated new voice signal as the voice signal subjected to voice recognition.

Specifically, the video display device 100 may divide an entire section of each of the plurality of voice signals into constant sections. The video display device 100 may compare the plurality of divided voice signals with respect to the same section. The video display device 100 may generate a new voice signal by combining some sections of each of the plurality of voice signals based on the comparison result.

This will be described below with reference to FIGS. 11A to 11C.

Figure 11A:
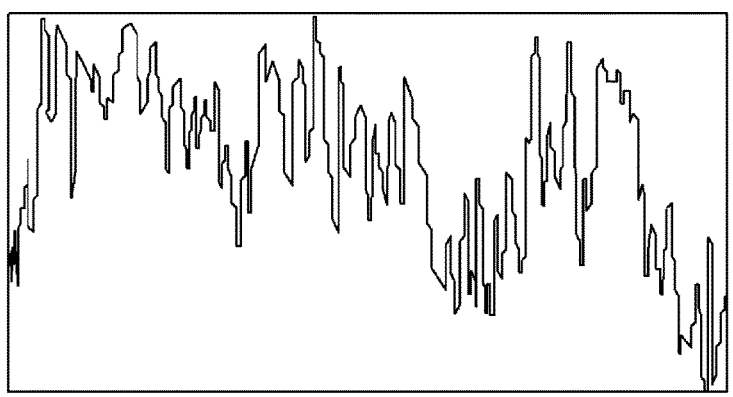
FIGS. 11a to 11c illustrate waveforms of the acquired voice signals according to an embodiment of the present invention.
Figure 11B:
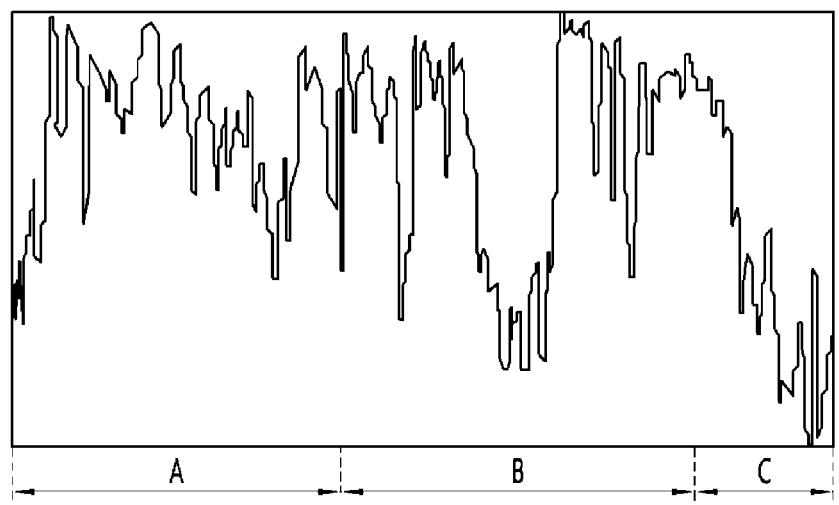
Figure 11C:
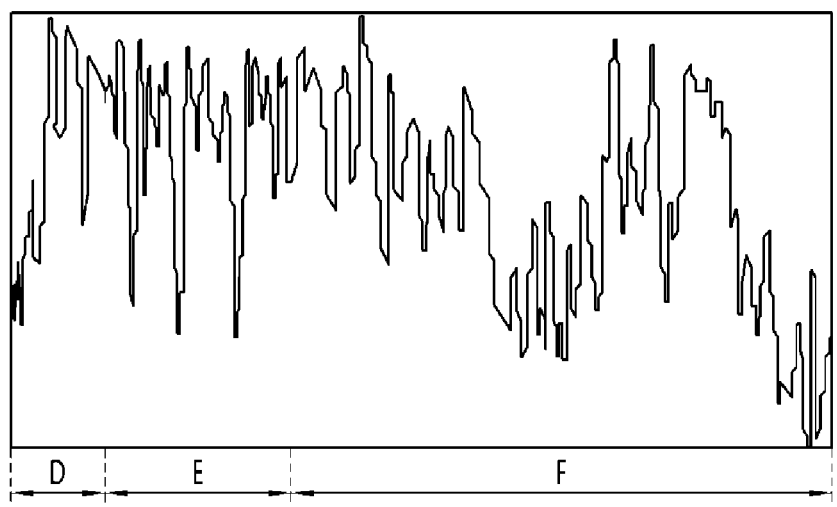

FIGS. 11a to 11c show waveforms of the acquired voice signals according to an embodiment of the present invention.

As an embodiment, FIG. 11a shows a voice signal for a voice uttered by a user. FIG. 11b shows a voice signal for a user voice acquired by the video display device 100. Section A and section C are the same as the voice signal for the voice uttered by the user in FIG. 11a. However, section B in which a user voice range level is low is not the same as the voice signal for the voice uttered by the user in FIG. 11a. FIG. 11c shows a voice signal for a user voice acquired by the remote control device 200. Section D and section F are the same as the voice signal for the voice uttered by the user in FIG. 11a. However, section E in which a noise level is high is not the same as the voice signal for the voice uttered by the user.

The video display device 100 may acquire a plurality of voice signals as shown in FIGS. 1b and 11c. The video display device 100 may compare the plurality of voice signals at each section. Accordingly, the video display device 100 may acquire a section having a high user voice range level or a section having a low noise level in the voice signal acquired by the video display device 100 and the voice signal acquired by the remote control device 200. The video display device 100 may acquire the section A in the voice signal acquired by the video display device 100 in FIG. 11*b* and the section F in the voice signal acquired by the remote control device 200 in FIG. 11*c*. The video display device 100 may generate a new voice signal based on the acquired sections A and F. Accordingly, the new voice signal generated by the video display device 100 may be a voice signal having the same waveform as that in FIG. 11*a*. The video display device 100 may determine the generated new voice signal as the voice signal subjected to voice recognition.

Again, FIG. 5 is described.

The video display device 100 recognizes the voice uttered by the user based on the voice signal subjected to voice recognition (S111).

The control unit 170 of the video display device 100 may recognize the voice uttered by the user based on the voice signal subjected to voice recognition, which is acquired in operation S109.

According to an embodiment, the control unit 170 may convert the voice uttered by the user into a text based on the acquired voice signal subjected to voice recognition. The control unit 170 may convert the acquired voice signal into a text by using an STT method. Then, the control unit 170 may recognize the voice uttered by the user based on the converted text. Since the STT method is a known technology, detailed descriptions thereof will be omitted.

According to another embodiment, the control unit 170 may search for a voice signal matching the acquired voice signal subjected to voice recognition, and recognize the acquired voice signal subjected to voice recognition. Specifically, the control unit 170 may search for the matched voice signal by comparing the acquired voice signal subjected to voice recognition with a prestored voice signal. Then, the control unit 170 may recognize the voice uttered by the user based on the found voice signal.

Hereinafter, the recognition of the voice uttered by the user in the video display device 100 will be described with reference to FIG. 6. Herein, it is assumed that the voice uttered by the user is "Volume up" as described above.

Referring to FIG. 6, the voice recognition unit 174 of the video display device 100 may receive at least one of a user voice acquired by the voice acquisition unit 110, a user voice acquired by the remote control device 200, and a generated voice signal. The STT 175 of the video display device 100 may convert the received voice "Volume up" into a text. The STT 175 may transfer the converted text to the NLP 177. The NLP 177 may convert the received text into a command system that can be processed by the video display device 100. The control unit 170 may recognize the voice uttered by the user based on the converted command.

Again, FIG. 5 is described.

The video display device 100 searches for a control operation corresponding to the recognized voice (S113).

The control unit 170 of the video display device 100 may search for the control operation corresponding to the recognized voice from at least one of the storage unit 140 and the network server connected through the network interface unit 133.

According to an embodiment, the control unit 170 may search for the control operation corresponding to the text converted in operation S111 from at least one of the database stored in the storage unit 140 and the database of the network server connected through the network interface unit 133. Then, the control unit 170 may acquire the control operation corresponding to the converted text.

According to another embodiment, the control unit 170 may search for the control operation corresponding to the voice signal found in operation S111 from at least one of the database stored in the storage unit 140 and the database of the network server connected through the network interface unit 133. Then, the control unit 170 may acquire the control operation corresponding to the found voice signal.

According to another embodiment, the control unit 170 may search for the control operation corresponding to the acquired voice signal from at least one of the database stored in the storage unit 140 and the database of the network server connected through the network interface unit 133, without experiencing the voice recognition operation S111. Specifically, the control unit 170 may search for the voice signal matching the acquired voice signal from at least one of the database stored in the storage unit 140 and the database of the network server connected through the network interface unit 133, and may acquire the control operation corresponding to the found voice signal.

Hereinafter, the control operation search of the video display device 100 will be described with reference to FIG. 6.

Referring to FIG. 6, the control unit 170 of the video display device 100 may search for the control operation corresponding to the converted command "Volume up". Accordingly, the control unit 170 may acquire an audio volume-up operation that is the control operation corresponding to "Volume up".

On the other hand, operation S113 may be included in operation S111 or operation S115 to be described below.

Again, FIG. 5 is described.

The video display device 100 performs the found control operation (S115).

The control unit 170 of the video display device 100 may perform the control operation acquired through the searching of operation S113. The control operation performed by the control unit 170 may include an overall control operation of the video display device 100.

For example, the control unit 170 of the video display device 100 may perform, as the found control operation, at least one of a power on/off operation of the video display device 100, a channel change operation, a volume control operation, a screen setting operation, a sound setting operation, a program information display operation, a broadcast information display operation, an application execution operation, an application manipulation operation, a web surfing operation, a keyword search operation, a content search operation, and a content manipulation operation.

According to an embodiment, when the recognized voice is "How's the weather today?", the control unit 170 may display today's weather information on the display unit 180 as the control operation corresponding to the recognized voice.

According to another embodiment, when the recognized voice is "Show me news channel", the control unit 170 may change the currently displayed channel to a news channel as the control operation corresponding to the recognized voice.

According to further another embodiment, when the recognized voice is "Show me funny things", the control unit 170 may display a favorite VOD content list and a preferred channel list as the control operation corresponding to the recognized voice.

Hereinafter, the control operation execution of the video display device 100 will be described with reference to FIG. 6.

Referring to FIG. 6, the control manager 173 of the video display device 100 may perform the acquired audio volume-up operation. Accordingly, the video display device 100 may turn up an audio volume. The above descriptions about the control operation execution of the control unit 170 are only for illustrative purposes. In addition to the above descriptions, the control unit 170 may perform various control operations that can be performed by the video display device 100, based on the recognized voice.

According to another embodiment of the present invention, the video display device 100 may display the representation of the speaking person on the display unit 180.

The representation of the speaking person, which is displayed by the video display device 100, may include at least one of a text, a photo, and a symbol.

This will be described below with reference to FIG. 12.

Figure 12:
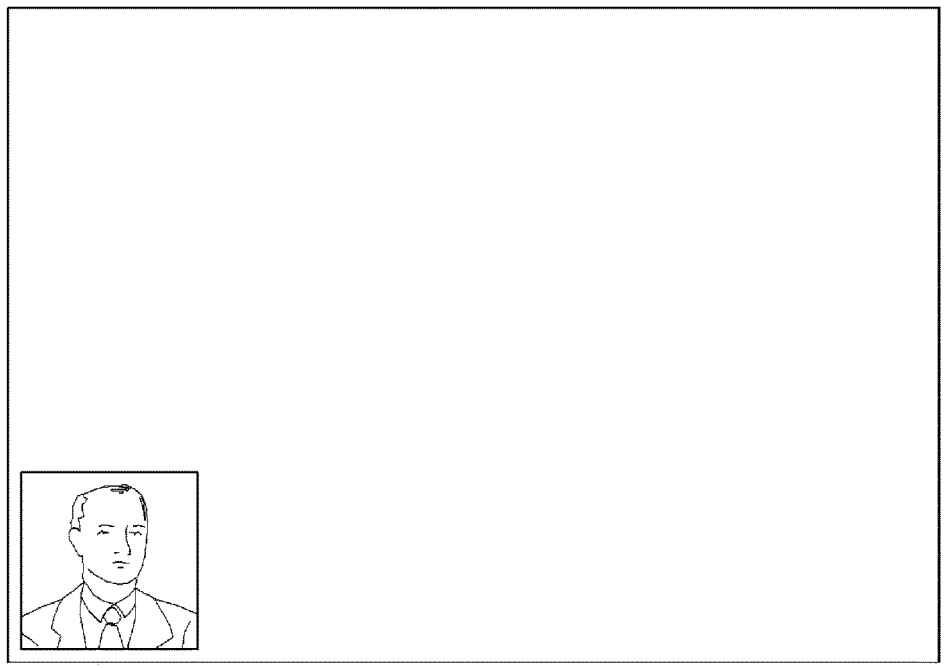
FIG. 12 illustrates the representation of a speaking person according to an embodiment of the present invention.

FIG. 12 illustrates the representation of a speaking person according to an embodiment of the present invention.

Referring to FIG. 12, the video display device 100 may display an image of the speaking person. According to an embodiment, the video display device 100 may determine a location of the speaking person based on the acquired voice signal. The video display device 100 may acquire the image of the speaking person through the image acquisition unit 120 based the determined location of the speaking person. The control unit 170 may display the acquired image of the speaking person on a part of the entire screen of the display unit 170.

Additionally, the video display device 100 may display information on a device capable of acquiring an optimal voice with respect to each of a plurality of users.

This will be described below with reference to FIG. 13.

Figure 13:
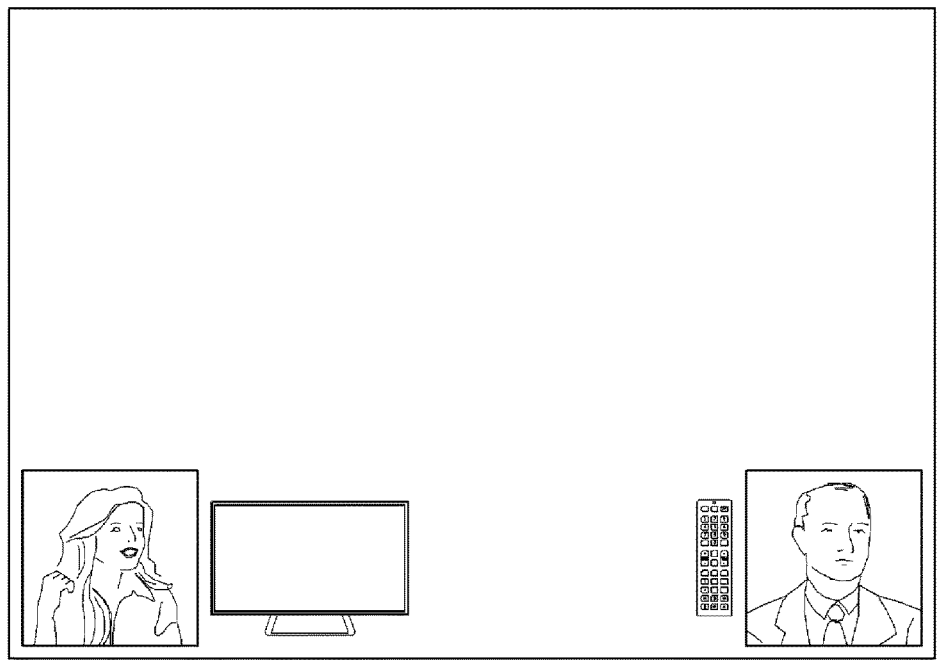
FIG. 13 illustrates the representation of a plurality of speaking persons according to an embodiment of the present invention.

FIG. 13 illustrates the representation of a plurality of speaking persons according to an embodiment of the present invention.

Referring to FIG. 13, the video display device 100 may display information on devices capable of optimally acquiring voices with respect to a plurality of users. According to an embodiment, the video display device 100 may acquire voices uttered by a plurality of users through at least one of the voice acquisition unit 110, the remote control device 200, and the terminal 300. The video display device 100 may compare one or more voice signals for the acquired voices and determine devices capable of optimally acquiring the voices with respect to the plurality of users based on the comparison result. The video display device 100 may display icons of the determined devices on a part of the entire screen. Therefore, as shown in FIG. 13, the icons of the devices capable of optimally acquiring the voices with respect to the plurality of users may be displayed together with the images of the users. Accordingly, each of the plurality of users can recognize the device capable of optimally acquiring his or her voice.

According to another embodiment of the present invention, the video display device 100 may acquire the voice signal of the user through the terminal 300 on which a voice recognition application is installed.

This will be described below with reference to FIG. 14.

FIG. 14 is a view illustrating an example of user voice signal acquisition according to an embodiment of the present invention.

Referring to FIG. 14, the video display device 100 may acquire the voice signal of the user through the terminal 300 on which the voice recognition application is installed. According to an embodiment, the video display device 100 may receive, from the terminal 300, the voice that the user utters to the terminal 300 on which the voice recognition application is installed. Specifically, the terminal 300 may acquire the user voice in a state in which the voice recognition application is executed. The terminal 300 may display a voice recognition icon 410 on the executed application. The terminal 300 may transmit the voice signal of the acquired user voice to the video display device 100. The video display device 100 may perform a control operation corresponding to the voice signal received from the terminal 300.

According to an embodiment, the above-described method may be embodied as processor-readable codes in a medium on which a program is recorded. Examples of processor-readable mediums include ROM, RAM, CD-ROM, a magnetic tape, a floppy disk, an optical data storage device, and the like. If desired, the processor-readable medium may be realized in the form of a carrier wave (for example, a transmission over the Internet).

The aforementioned video display devices are not applied such that the configurations and methods according to the embodiments are limited, but all or part of the embodiments may be selectively combined and configured to achieve various modifications.

What is claimed is:

1. A method for operating a video display device, the method comprising:
   transmitting a voice acquisition command signal to at least one peripheral device connected to the video display device;
   receiving at least one first voice signal acquired by the at least one peripheral device in response to the voice acquisition command signal, wherein the at least one first voice signal is acquired through a microphone of the at least one peripheral device;
   receiving at least one second voice signal acquired through a microphone of the video display device;
   comparing a voice level of the first voice signal with a voice level of the second voice signal or a noise level of the first voice signal with a noise level of the second voice signal;
   based on the comparison result, selecting a voice signal from the first voice signal or the second voice signal for performing voice recognition;
   recognizing a voice of a user based on the selected voice signal; and
   controlling the video display device to perform an operation corresponding to the recognized voice,
   wherein the voice acquisition command signal is transmitted from the video display device to the at least one peripheral device based on a trigger voice.

2. The method of claim 1, wherein the at least one peripheral device comprises a remote control device and a mobile terminal.

3. The method of claim 1, wherein selecting the voice signal is based on determining a voice signal having a highest voice level among the first voice signal and the second voice signal.

4. The method of claim 1, wherein selecting the voice signal is based on determining a voice signal having a lowest noise level among the first voice signal and the second voice signal.

5. The method of claim 1, wherein the controlling operation of the video display device comprises:
   searching for the operation corresponding to the recognized voice of the user; and
   controlling the video display device to perform the searched operation.

6. The method of claim 5, wherein the searching for the operation corresponding to the recognized voice of the user comprises:
- searching one or more prestored voice signals matching the recognized voice of the user; and
- identifying an operation corresponding to a matching voice signal.

7. The method of claim 1, wherein the recognizing of the voice of the user comprises converting the selected voice signal into a text.

8. The method of claim 7, wherein the performed operation corresponds to the converted text.

9. The method of claim 1, wherein selecting the voice signal comprises:
- dividing the first voice signal into a plurality of first sections and dividing the second voice signal into a plurality of second sections;
- comparing the first sections and the second sections;
- generating a voice signal based on the comparison result; and
- selecting the generated voice signal as the voice signal for performing voice recognition.

10. The method of claim 9, wherein the comparing the first sections and the second sections comprises comparing corresponding sections of the first voice signal and the second voice signal based on at least a voice level or a noise level.

11. The method of claim 9, wherein generating the voice signal comprises combining some sections of each of the first voice signal and the second voice signal.

12. The method of claim 1, further comprising displaying a voice acquisition icon indicating that the voice of the user is being acquired.

13. The method of claim 1, further comprising displaying at least one peripheral device icon that is acquiring a voice signal.

14. A video display device comprising:
- a voice acquirer configured to recognize a trigger voice;
- a communicator configured to transmit a voice acquisition command signal to at least one peripheral device connected to the video display device; and
- a controller configured to:
  - receive at least one first voice signal acquired by the at least one peripheral device in response to the voice acquisition command signal, wherein the first voice signal is acquired through a microphone of the peripheral device;
  - receive at least one second voice signal acquired through a microphone of the video display device;
  - compare a voice level of the first voice signal with a voice level of the second voice signal or a noise level of the first voice signal with a noise level of the second voice signal;
  - based on the comparison result, select a voice signal from the first voice signal or the second voice signal for performing voice recognition;
  - recognize a voice of a user based on the selected voice signal; and
  - control the video display device to perform an operation corresponding to the recognized voice,
  - wherein the voice acquisition command signal is transmitted from the video display device to the at least one peripheral device based on the recognized trigger voice.

15. The video display device of claim 14, wherein the controller is further configured to select the voice signal having a highest voice level among the first voice signal and the second voice signal.

16. The video display device of claim 14, wherein the controller is further configured to select the voice signal having a lowest noise level among the first voice signal and the second voice signal.

17. The video display device of claim 16, further comprising a display configured to display at least a peripheral device icon corresponding to the peripheral device that is acquiring a voice signal.

18. The video display device of claim 14, wherein the controller is further configured to determine a location of the user based on the first voice signal and the second voice signal.

19. The video display device of claim 18, further comprising:
- a display; and
- an image acquirer configured to acquire an image of the user,
- wherein the controller is further configured to acquire the image of the user based on the determined location of the user and cause the display to display the acquired image of the user.

20. The video display device of claim 14, further comprising a display,
wherein the controller is further configured to cause the display to display a voice acquisition icon indicating that the voice of the user is being acquired.

* * * * *